FLUID OSCILLATOR HAVING VARIABLE VOLUME FEEDBACK LOOPS

Filed April 18, 1967

INVENTOR.
WILLIAM C. O'NEILL
BY H. W. Leach
Paul S. Collignon
Attorneys

United States Patent Office 3,448,752

Patented June 10, 1969

3,448,752

FLUID OSCILLATOR HAVING VARIABLE VOLUME FEEDBACK LOOPS

William C. O'Neill, Washington, D.C., assignor, by mesne assignments, to the United States of America as represented by the Secretary of the Navy Filed Apr. 18, 1967, Ser. No. 635,298
Int. Cl. F15c *1/00, 1/14*
U.S. Cl. 137—81.5 3 Claims

ABSTRACT OF THE DISCLOSURE

A pure fluid oscillator having a power jet nozzle for issuing a power stream, an interaction region having first and second vent channel sidewalls, and first and second vent channels with feedback paths being provided from said first and second vent channels to first and second orifices, respectively, in said vent channel sidewalls. The volume of the feedback loops are made variable by connecting each feedback loop to a separate leg of a manometer and by utilizing a pressure on the control leg of the manometer.

*Background of the invention*

The present invention relates to a fluid oscillator and more particularly to a fluid oscillator having feedback means that are made variable whereby the frequency of oscillation is regulated. Various types of pure fluid oscillators utilizing feedback are known in the art. Examples of such oscillators may be found in U.S. Patent 3,185,166, granted to Billy M. Horton and Ronald E. Bowles and also in U.S. Patent 3,158,166 granted to Raymond W. Warren.

In U.S. Patent 3,217,727, which issued Nov. 16, 1965, to Chris E. Spyropoulos, there is shown a feedback path which is used to provide an additional tuning means for an oscillator. A tuning valve is provided in the feedback path and, by adjusting this valve, a controlled amount of pressure from a load channel may be fed back on the side of the stream opposed to differential pressure control means. This has the effect of delaying the time when the power jet will switch out of the load channel into the vent channel since switching of the power jet is controlled by the differential pressure across the jet.

*Summary of the invention*

The present invention relates to a fluid oscillator having an inlet nozzle for issuing a power stream and first and second vent channels. Feedback paths are provided from the vent channels to first and second control nozzles in the vent channel sidewalls to provide a bistable element. The frequency of the oscillator is regulated by a control pressure which varies the volume of the feedback loops. Each feedback loop is connected to one leg of a manometer and a control pressure is connected to the other leg of the manometer. The volume of the feedback path can be greatly varied with a small change in controlling pressure. In one embodiment of the invention, separate manometers are used for each feedback loop, and in another embodiment one manometer is used for both feedback loops.

It is therefore a general object of the present invention to provide improved means for varying the frequency of a bistable fluidic oscillator.

Other objects and advantages of the present invention will be readily appreciated as the same becomes better understood by reference to the following detailed description when considered in connection with the accompanying drawing.

*Description of the preferred embodiments*

Figure 1:
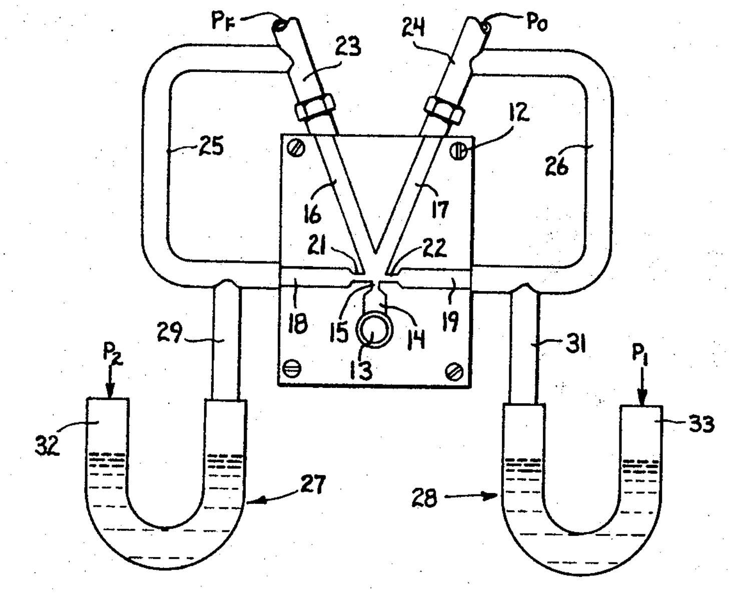
FIGURE 1 is a schematic diagram of a fluidic oscillator incorporating one embodiment of the present invention.

Referring now to FIGURE 1 of the drawing, there is shown a bistable oscillator 11 well-known in the art. The oscillator 11, in its most common form, is formed by two plates held together by screws 12. The channels, nozzles, orifices, and the like, might by way of example, be cut or etched in one plate and the other plate serves as a cover. The top plate in FIGURE 1 is shown as clear plastic, for convenience. The operating fluid power supply is applied at 13 and the power stream is formed in the power jet nozzle 14. The power stream issues from the power jet nozzle orifice 15 and is directed alternately into vent channels 16 and 17. Oscillator 11 includes first and second opposed control stream input channels 18 and 19 which terminate in nozzles 21 and 22, respectively.

The vent channels 16 and 17 are arranged symmetrically with respect to the fluid flow emanating from orifice 15 in order that in the absence of any control stream flow from either of the nozzles 21 or 22, the power stream fluid arbitrarily flows through one of the vent channels 16 or 17 and is not arranged to flow through any particular one of them. Output tubes 23 and 24 are attached to vent channels 16 and 17, respectively. Feedback path 25 is connected between output tube 23 and control stream input channel 18, and likewise, feedback path 26 is connected between output tube 24 and control stream input channel 19.

As shown in FIGURE 1 of the drawing, a pair of manometers 27 and 28 are provided, and one leg of manometer 27 is connected through channel 29 to feedback path 25, and one leg of manometer 28 is connected through channel 31 to feedback path 26. By varying the pressure of control leg 32 of manometer 27, the volume of the feedback loop from output tube 23 to control stream input channel 18 is made variable, and likewise, by varying the pressure of control leg 33 of manometer 28, the volume of the feedback loop from output tube 24 to control stream input channel 19 is made variable.

Figure 3:
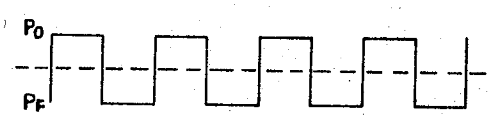
FIGURE 3 illustrates waveforms obtained from the oscillator of FIGURE 1.
Figure 3:
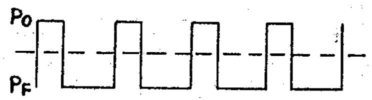
Figure 3:
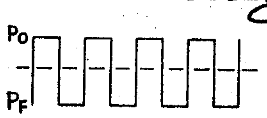

Referring now to FIGURE 3 of the drawing, FIGURE 3(*a*) shows a condition where P1 and P2 both equal zero gage pressure. As the volumes of the feedback loops are made equal, the periods of flow in each side of oscillator 11 are equal, that is, the period of flow in vent channel 16 will equal the period of flow in vent channel 17. FIGURE 3(*b*) shows the effect of increasing P1, which increase reduces the volume of the feedback path, which in turn, causes the frequency of the oscillator to be increased. FIGURE 3(*c*) shows the effect of increasing both P1 and P2 so that they are equal but greater than zero. The period of time that fluid flows in vent channel 16 is equal to the period of time that fluid flows in vent channel 17, however, the frequency of oscillation has increased. It can be seen that by adjusting P1 and P2 to different values, that a wide range of frequency combinations can be obtained.

Figure 2:
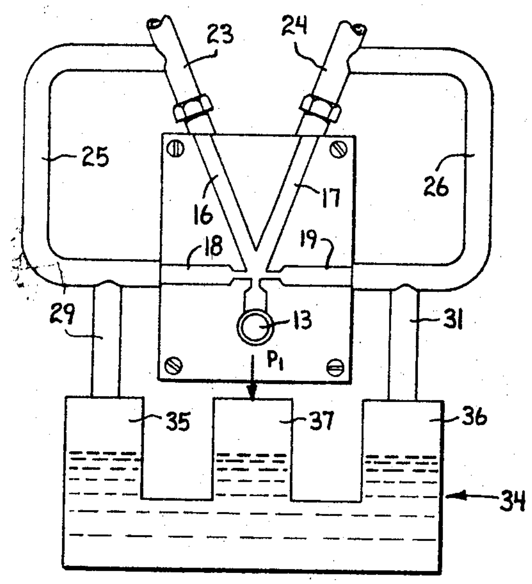
FIGURE 2 is a schematic diagram of a fluidic oscillator incorporating another embodiment of the present invention.

Referring now to FIGURE 2 of the drawing, there is shown another embodiment of the invention wherein one manometer 34 is utilized. Output leg 35 of manometer 34 is connected through channel 29 to feedback path 25 and output leg 36 of manometer 34 is connected through channel 31 to feedback path 26. Control leg 37 of manometer 34 is connected to both output legs 35 and 36 and by varying the pressure of control leg 37 the volumes of feedback loops 25 and 26 are made variable in equal increments. Accordingly, although the frequency is variable, the period of time that fluid flows in vent channel 16 is equal to the period of time that fluid flows in vent channel 17.

It can thus be seen that the present invention provides an improved device for varying the volume of a feedback line in a fluid oscillator. Obviously many modifications and variations of the present invention are possible in the light of the above teachings.

What is claimed is:

1. A fluidic oscillator comprising:

a power jet nozzle for issuing a power stream, an interaction region having first and second vent channels connected thereto, first and second control nozzles connected to said interaction region for alternately deflecting said control stream into said first and second vent channels, first and second output tubes connected respectively to said first and second vent channels, a first feedback path connected between said first output tube and said first control nozzle, and a second feedback path connected between said second output tube and said second control nozzle, and at least one manometer for controlling the volumes of said first and second feedback paths whereby the frequency of oscillation of said power stream between said first and second vent channels is regulated.

2. A fluidic oscillator as set forth in claim 1 wherein said at least one manometer for controlling the volumes of said first and second feedback paths includes a manometer having first and second output legs and a control leg, said first output leg being connected to said first feedback path and said second output leg being connected to said second feedback path.

3. A fluidic oscillator as set forth in claim 1 wherein said at least one manometer for controlling the volumes of said first and second feedback paths includes first and second manometers each having a control leg and an output leg, said output leg of said first manometer being connected to said first feedback path and said output leg of said second manometer being connected to said second feedback path.

References Cited

UNITED STATES PATENTS

| | | | |
|---|---|---|---|
| 3,159,168 | 12/1964 | Reader | 137—81.5 |
| 3,185,166 | 5/1965 | Horton et al. | 137—81.5 |
| 3,277,914 | 10/1966 | Manion | 137—81.5 |
| 3,320,966 | 5/1967 | Swartz | 137—81.5 |
| 3,331,380 | 7/1967 | Schonfield et al. | 137—81.5 |

M. CARY NELSON, *Primary Examiner.*

W. R. CLINE, *Assistant Examiner.*